(12) United States Patent
Hasegawa

(10) Patent No.: US 6,600,711 B1
(45) Date of Patent: Jul. 29, 2003

(54) OPTICAL RECORDING MEDIUM INCLUDING PREPIT SEQUENCE FORMED AT PREDETERMINED INTERVAL BETWEEN LAND TRACK AND NEIGHBORING GROOVE TRACK ALONG SPIRAL

(75) Inventor: Hiroshi Hasegawa, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/343,473

(22) Filed: Jun. 30, 1999

(30) Foreign Application Priority Data

Jun. 30, 1998 (JP) .......................................... 10-199514

(51) Int. Cl.$^7$ ................................................ G11B 7/00
(52) U.S. Cl. ............... 369/109.02; 369/111; 369/275.3; 369/275.4
(58) Field of Search ................... 369/275.3–275.4, 369/109.01–109.02, 111

(56) References Cited

U.S. PATENT DOCUMENTS

| | | | | |
|---|---|---|---|---|
| 4,761,775 A | * | 8/1988 | Murakami | 369/44.26 |
| 5,616,390 A | * | 4/1997 | Miyagawa et al. | 369/275.3 X |
| 6,337,839 B1 | * | 1/2002 | Nakane et al. | 369/275.3 X |
| 6,404,729 B1 | * | 6/2002 | Yamaoka et al. | 369/275.4 |

* cited by examiner

*Primary Examiner*—W. R. Young
(74) *Attorney, Agent, or Firm*—Pillsbury Winthrop LLP

(57) ABSTRACT

An optical recording medium includes a land track and a groove track formed as a recording track to record and write information. A prepit sequence is formed on a middle position between the land track and the neighboring groove track as a head part of each sector on the recording track. The groove track is continuously formed on the prepit sequence section. The land track and the groove track are mutually formed as one spiral line or respectively formed as two parallel spiral lines on a surface of the optical recording medium.

24 Claims, 10 Drawing Sheets

OPTICAL RECORDING MEDIUM INCLUDING PREPIT SEQUENCE FORMED AT PREDETERMINED INTERVAL BETWEEN LAND TRACK AND NEIGHBORING GROOVE TRACK ALONG SPIRAL

FIELD OF THE INVENTION

The present invention relates to an optical recording medium and an optical read/write apparatus for reading information from and writing information to the optical recording medium.

BACKGROUND OF THE INVENTION

One kind of optical recording medium is a phase change optical disk. With a phase change type optical disk a groove track is formed on the optical disk to guide the optical beam and for reading and writing information, and a land track between two neighboring groove tracks along a radial direction of the disk is also used for reading and writing information. In short, both the groove track and the land track are used as a recording track, which is called the "land groove recording method". In the land/groove recording method, a space between two neighboring recording tracks ((the land track)+(the groove track)) along the radial direction is one half of the space between two neighboring groove tracks along the radial direction. By carefully selecting the depth of the groove, crosstalk between the land track and the neighboring groove track decreases.

In the optical disk, the recording track is divided into a plurality of sectors as a data unit of predetermined length. A header including address information such as sector number is previously set at the head part of each sector. This header is formed as a ⌐¬ pattern of a prepit sequence on the surface of the disk.

When using both the land track and the groove track as the recording track, the decrease of crosstalk is only affected for two neighboring recording tracks (the land track and neighboring groove track). Crosstalk greatly increases around the prepit sequence section in the recording track. Therefore, as shown in FIG. 1, the prepit sequence is not located on the recording track but on the middle position between the land track and the neighboring groove track by cutting the groove track at equal spaces. A space between two neighboring prepit sequences is two times the width of the recording track (the width of the land track or the width of the groove track). In FIG. 1 the prepit sequence P0 is commonly used by the land track L0 and the groove track G0, the pit sequence P1 is commonly used by the land track L1 and the groove track G1; the pit sequence P2 is commonly used by the land track L2 and the groove track G2 in order to avoid crosstalk.

In the case of locating the prepit sequence on the middle position between the land track and neighboring groove track by cutting the groove track at equal spaces, the prepit sequence section is not used as the data recording track. Therefore, in the optical disk such as a DVD-RAM of the prior art, each prepit sequence section P0, P1, and P2 is located along the radial direction from inner circle to the outer circle as shown in FIG. 1. As a result, a length of one circle of the optical disk is a product of the sector length and a positive integer. Because of the limitation on location of the prepit sequence, actual linear recording density is set low in comparison with an upper limit of linear recording density along the track direction. Furthermore, a length of one sector on the outer track is longer than a length of one sector on the inner track.

Therefore, the linear recording density of the outer track is lower than the actual linear recording density. As a result, total recording quantity on the entire surface of the disk is lower than a quantity determined by the upper limit of the linear recording density.

In order to avoid a loss of the recording quantity caused by the limitation of the prepit sequence location, for example, a ZCLV (zone constant linear velocity) method is applied. In this method, as shown in FIG. 2, the surface of the disk is divided into a plurality of zones (rings). In each zone, a plurality of the prepit sequence sections are arranged. The area of each sector in one zone is then equal, and the number of sectors increases in proportion to outer circle of the zone. However, in this method, the loss of recording quantity remains because of the limitation of the sector length. Furthermore, other factors causing the loss of the recording quantity (for example, non-use of the recording track neighboring the prepit sequence section over a boundary of the zone) occur.

As mentioned-above, in the optical recording medium of the prior art, by limiting the location of the prepit sequence, the recording quantity is smaller than the recording quantity of the surface of the disk determined by the upper limit of the linear recording density.

SUMMARY OF THE INVENTION

It is an object of the present invention to provide an optical recording medium and an optical read/write apparatus to greatly increase the recording quantity without limiting the location of the prepit sequence.

According to the present invention, there is provided an optical recording medium on which a land track and a groove track are formed as a recording track to read and write information, comprising: a prepit sequence formed on the middle position between the land track and the groove track neighbored by unit of predetermined section on the recording track, the groove track being continuously formed on the prepit sequence section.

Further in accordance with the present invention, there is also provided an optical read/write apparatus, comprising: a spindle motor rotating an optical recording medium on which a land track and a groove track are formed as a recording track, the optical recording medium including a prepit sequence formed on a middle position between the land track and the neighboring groove track at predetermined intervals on the recording track, the groove track being continuously formed on the prepit sequence section; an optical head irradiating an optical beam on the optical recording medium rotated to read and write information; and an optical detector detecting a signal corresponding to the information from a reflected light on the optical recording medium.

DETAILED DESCRIPTION OF THE PREFERRED EMBODIMENT

Figure 3:
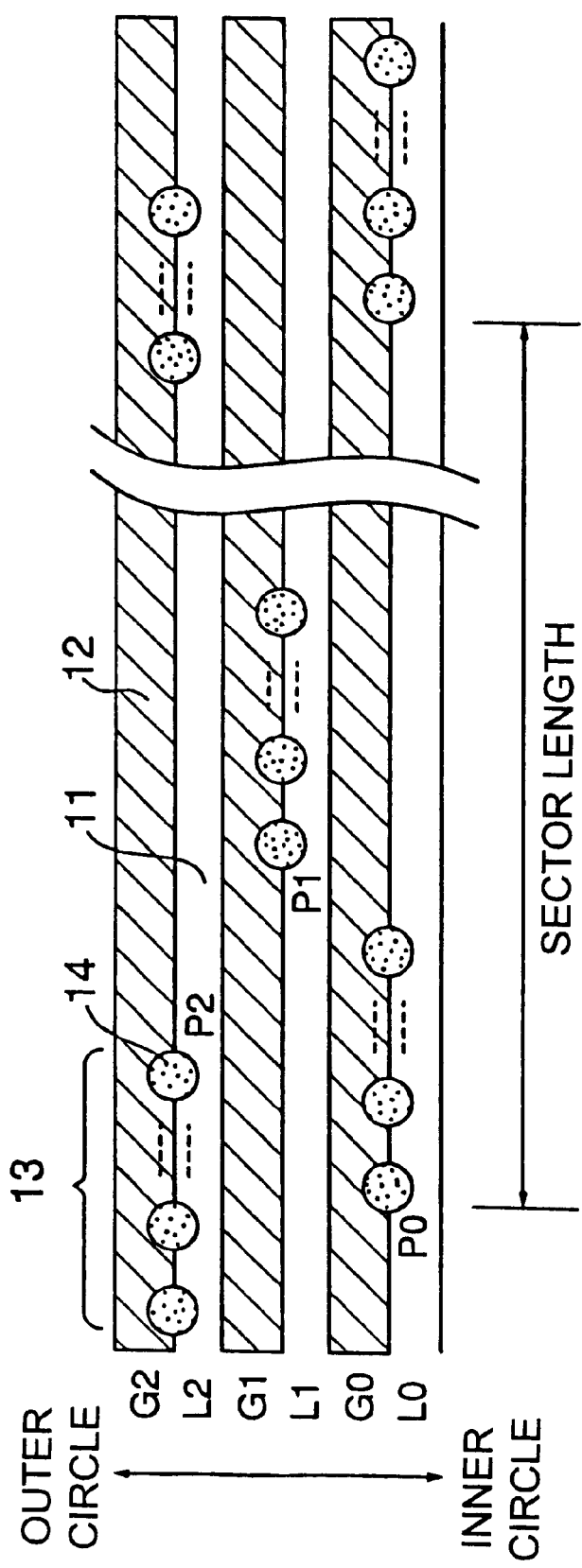
FIG. 3 is a plan of location of the track and the prepit sequence on the optical disk according to a first embodiment of the present invention.

FIG. 3 is a plan showing the location of the track and the prepit sequence on the optical recording medium according to a first embodiment of the present invention. This recording medium is a rewritable optical disk including a phase change type recording film. As shown in FIG. 3, the land track 11 and the groove track 12 are used as the recording track. The land track 11 is assigned the mark "L" and the groove track 12 is assigned the mark "G". The land track 11 and the groove track 12 are mutually arranged "L0, G0, L1, G1, L2, G2, . . . " in order from the inner circle to the outer circle. Furthermore, the prepit sequence 13 is formed on the middle position between the land track 11 and neighboring groove track 12 by unit of the sector on the recording track. In FIG. 3, the prepit sequence 13 is a header of each sector, in which address information is recorded.

Figure 4A:
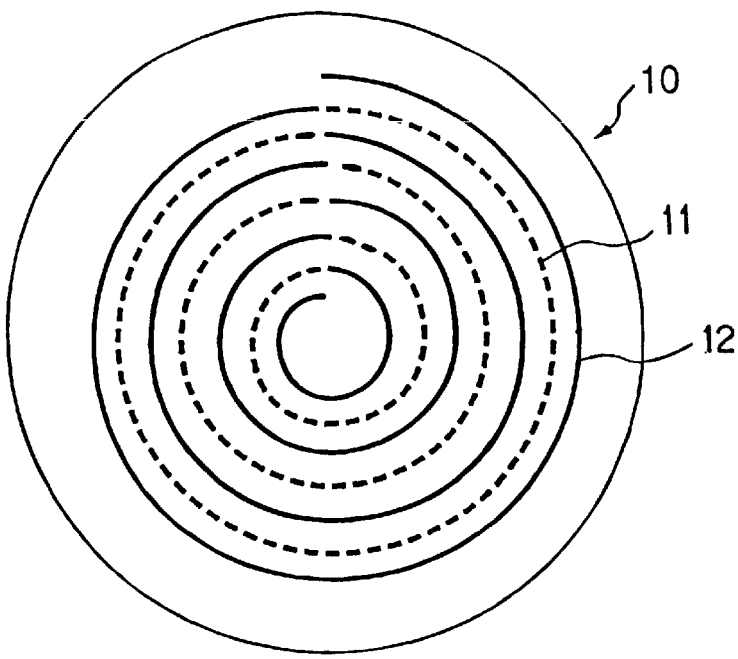
FIGS. 4A and 4B are schematic diagrams of the spiral format of the recording track on the optical disk.
Figure 4B:
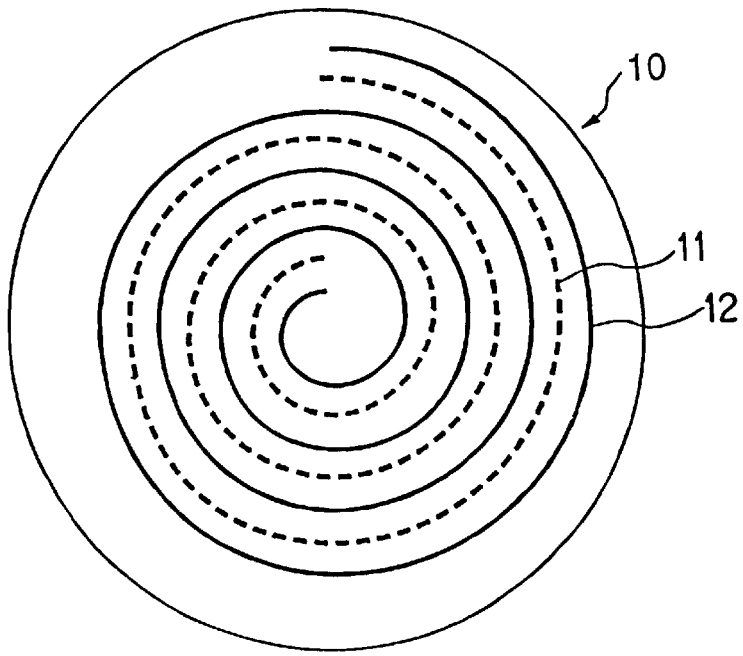

In general, the recording track is formed in a spiral. In this case, as a location method of the land track 11 and the groove track 12, a single spiral format as shown in FIG. 4A and a double spiral format as shown in FIG. 4B are selectively used. In the single spiral format, the land track 11 and the groove track 12 are mutually located on one spiral. In the double spiral format, the land track 11 and the groove track 12 are respectively located on two parallel spirals. The present invention is applied for both formats.

In FIG. 3, the prepit sequence 13 is assigned the mark "P" and commonly used by the land track 11 and neighboring groove track 12. The prepit sequence P0 is located on the middle position between the land track L0 and the groove track G0. The prepit sequence P1 is located on the middle position between the land track L1 and the groove track G1, and the prepit sequence P2 is located on middle position between the land track L2 and the groove track G2. In this case, these prepit sequences P0, P1, P2 do not necessarily neighbor each other along the radius direction of the disk.

As an aspect of this optical disk different from the land/groove recording method of the prior art, as shown in FIG. 3, the groove track 12 is continuously formed on not only the normal section of the recording track but also on the prepit sequence forming section 13. In this location, the prepit sequences P0, P1, P2 do not neighbor each other along the radius direction of the disk. This aspect is explained in detail by using FIGS. 5A, 5B and 6.

Figure 5A:
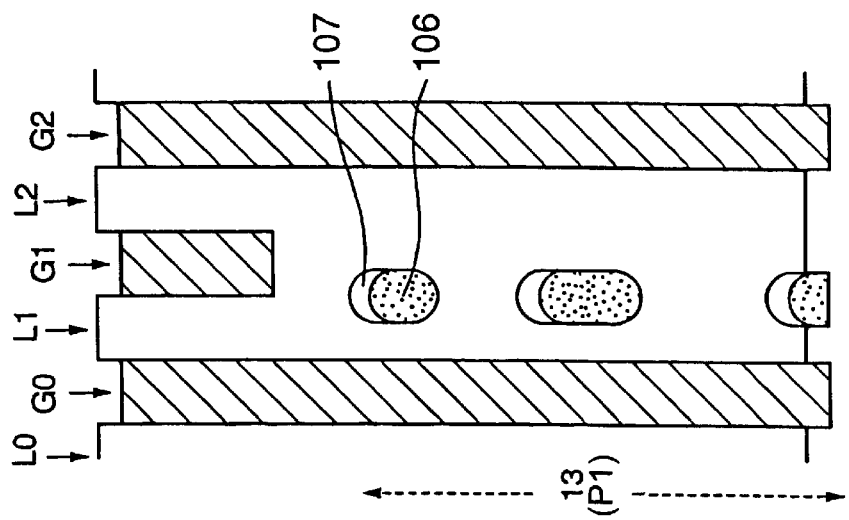
FIGS. 5A and 5B are respectively partial plans of a prepit sequence section and neighboring recording track on the optical disk according to the first embodiment of the present invention and the prior art.
Figure 6:
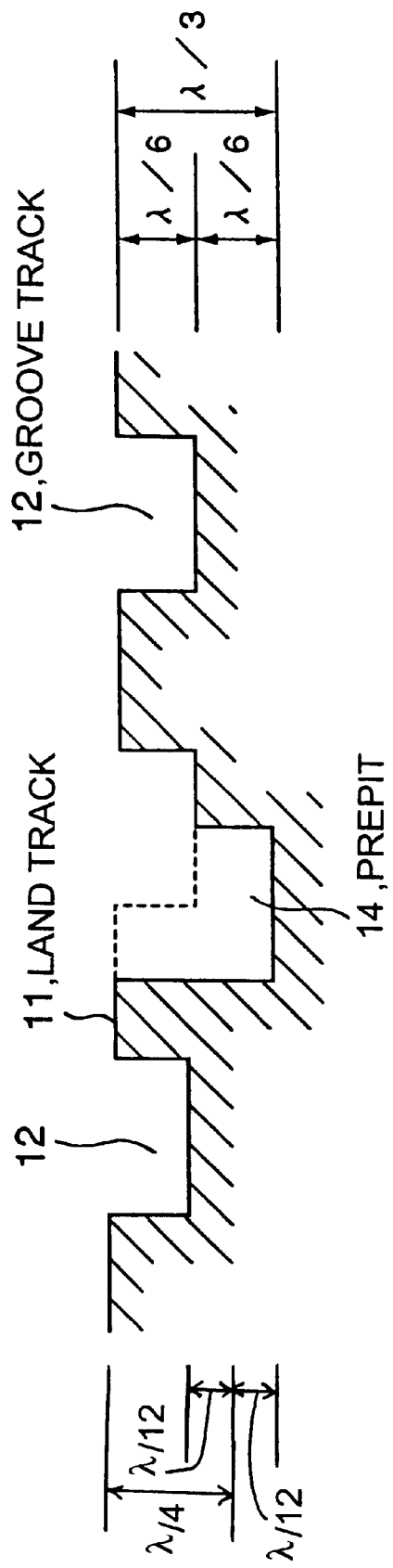
FIG. 6 is a sectional plan along the line A—A of the plan in FIG. 5A.

FIG. 5A is a partial plan view of a prepit sequence section and neighboring recording track on the optical disk according to the first embodiment of the present invention. FIG. 6 is a sectional plan along the line A—A of the plan in FIG. 5A. As shown in FIGS. 5A and 6, the groove track 12 is continuously formed on the prepit sequence section 13. In FIG. 5A, on the middle position between the groove track G1 and the land track L1, the prepit sequence P1 consists of a pit 14 whose depth is longer than the depth of the groove track 12. A part 15 represents the slope section of the pit 14.

Figure 5B:
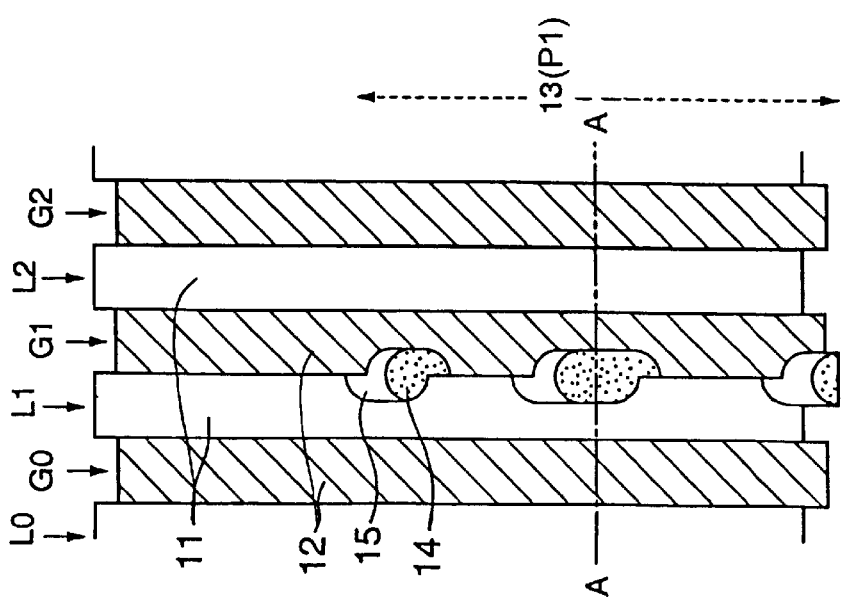

On the other hand, FIG. 5B is a partial plan of the prepit sequence section and neighboring recording track on the optical disk according to the prior art. In this prior art, the prepit sequence P1 is formed on a cut section of the groove track G1, and the prepit sequence P1 does not neighbor other prepit sequences along the radius direction of the disk. As for the land track L1 in FIG. 5B, in the data recording area except for the prepit sequence section P1, the groove track G1 and the groove track G2 are formed on both sides of the land track L2. Therefore, the optical beam irradiated to the land track L2 diffracts on both sides (the edge portion of the groove track G1 and the edge portion of the groove track G2).

On the contrary, the groove track G1 is cut on the prepit sequence section P1, and the groove track G1 is not formed at one side (left side) of the land track L2 on the prepit sequence section P1. Therefore, the optical beam does not diffract on the one side of the land track L2 on the prepit sequence section P1. Usually, tracking error detection is executed by using the imbalance of diffraction', light from both track edges in proportion to the track position aberration. However, in FIG. 5B, the tracking error detection is not precisely executed and the reading activation is not correctly executed by an uncontinuous increase of the total quantity of reflected light. As a result, the land track part L2 neighboring the prepit sequence section P1 is not used as the data recording area. On the other hand, in the first embodiment as shown in FIG. 5A, the groove track G1 is continuously formed on the prepit sequence section 13 as the one side of the land track L2. Therefore, the above-mentioned defects do not occur and the land track L2 neighboring the prepit sequence section P1 is used as the data recording area.

Figure 1:
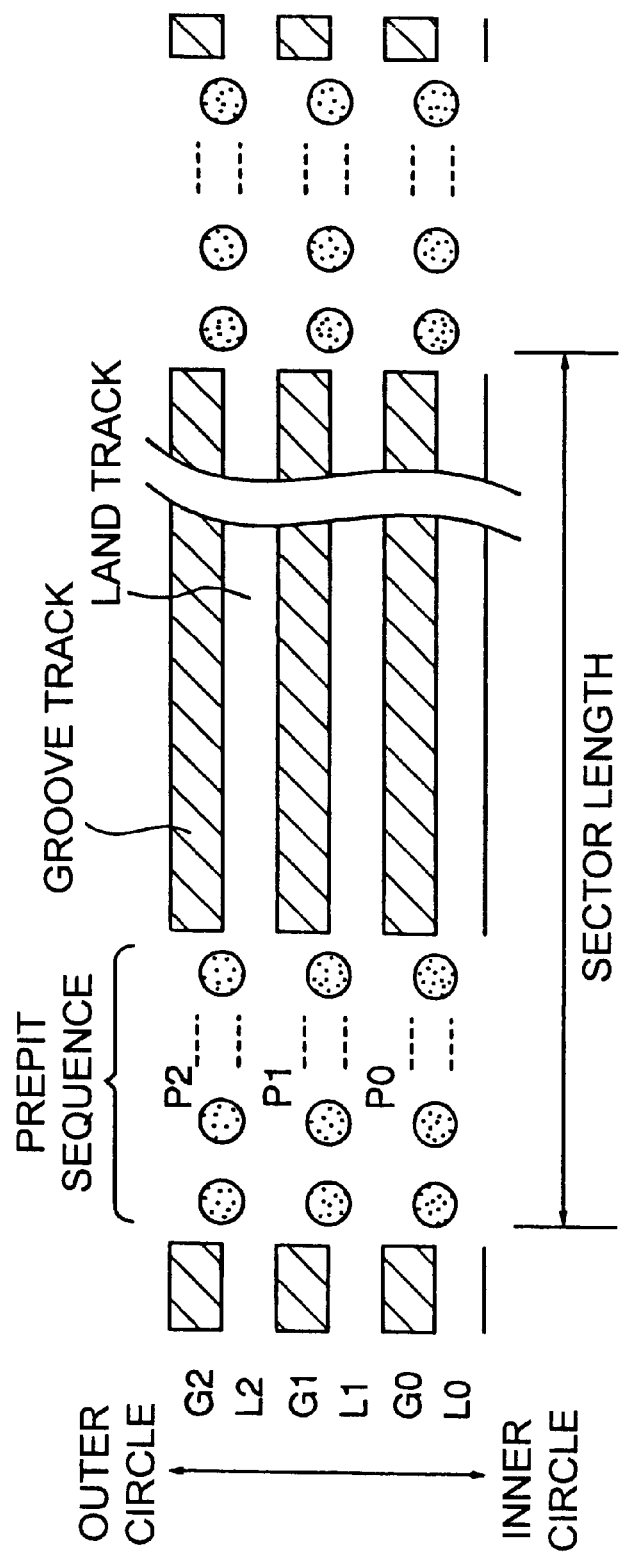
FIG. 1 is a plan of the location of the track and the prepit sequence on the optical disk according to the prior art.
Figure 2:
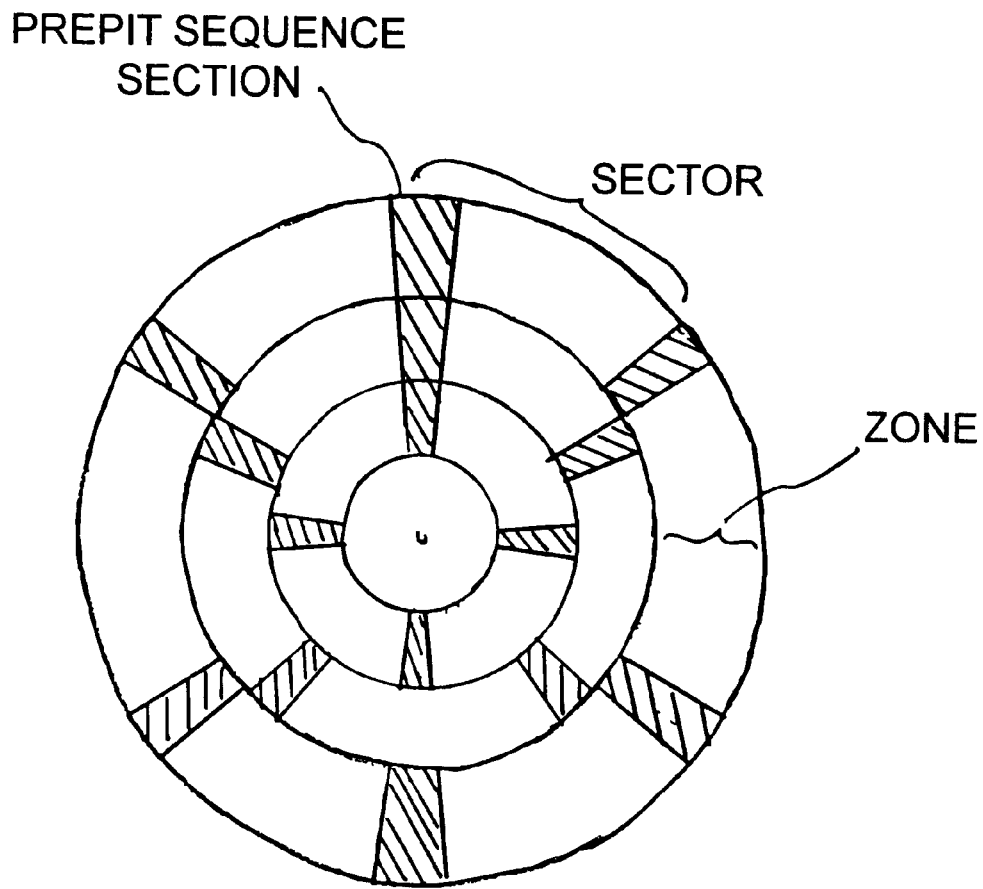
FIG. 2 is a schematic diagram of zone structure on the disk-according to the ZCLV method of the prior art.

In the optical disk of the prior art, as shown in FIG. 1, each prepit sequence section P0, P1, P2 is arranged along the radius direction of the disk so that the track section (the groove track and the land track) neighboring the prepit sequence section along the radius direction is not used as the data recording area. However, in the present invention, this structure is not necessary. The limitation that a length of one circle of the disk is a product of the sector length and a positive integer is also not necessary. Accordingly, the memory quantity greatly increases by approaching the linear recording density to the upper limit. For example, the normal CLV (constant linear velocity) method, which is useful to increase the memory quantity more than ZCLV method, may be applied.

In the first embodiment, in order to manufacture the optical disk on which the groove track and the prepit sequence partially neighbor one another and the prepit depth is longer than the groove depth, the recording for the disk substrate shaping is executed by two optical beams for the groove and the prepit. A power of the optical beam for the prepit is higher than a power of the optical beam for the groove. A process of substrate shaping itself is applied as usual and the product cost does not increase.

It is necessary that a satisfactory signal is read from both the land track and the groove track neighboring the prepit sequence section. For example, as shown in FIG. 6, if the groove track depth is $\lambda/6$ ($\lambda$: wave length of optical beam for reading on the disk), the prepit depth based on the land is determined as $\lambda/3$ (=$\lambda/4+\lambda/12$), and the prepit depth based on the groove track is determined as $\lambda/6$ ($=\lambda/4-\lambda/12$). In this case, an interference condition when reading from the land track is the same as an interference condition when reading from the groove track (symmetry for positive and negative based on the pit depth $\lambda/4$).

Figure 7:
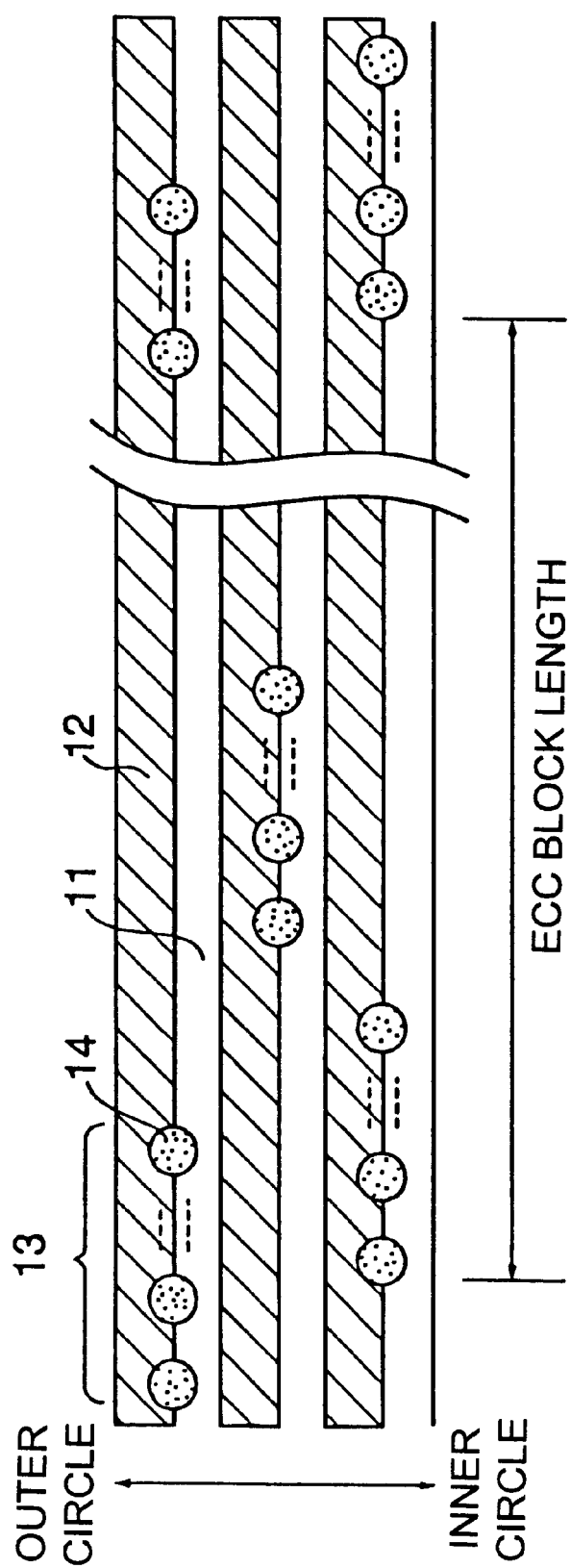
FIG. 7 is a plan of the location of the track and the prepit sequence on the optical disk according to a second embodiment of the present invention.

FIG. 7 is a plan of the location of the track and the prepit sequence on the optical disk according to a second embodiment of the present invention. In the first embodiment, the prepit sequence is the header of each sector. However, in the second embodiment, in case a plurality of sectors comprises one error correction block (ECC block), the prepit sequence 13 is formed as a header of the ECC block. The header of each sector is recorded as a phase change mark similar to data in the recording track. As mentioned-above, in the present invention, a plurality of prepit sequence sections 13 are not located along the radius direction of the disk. In the second embodiment, a space between two prepit sequence sections 13 is prolonged. In comparison with the first embodiment, a plurality of the prepit sequence sections of each sector in ECC BLOCK are omitted and the memory quantity further increases.

Figure 8:
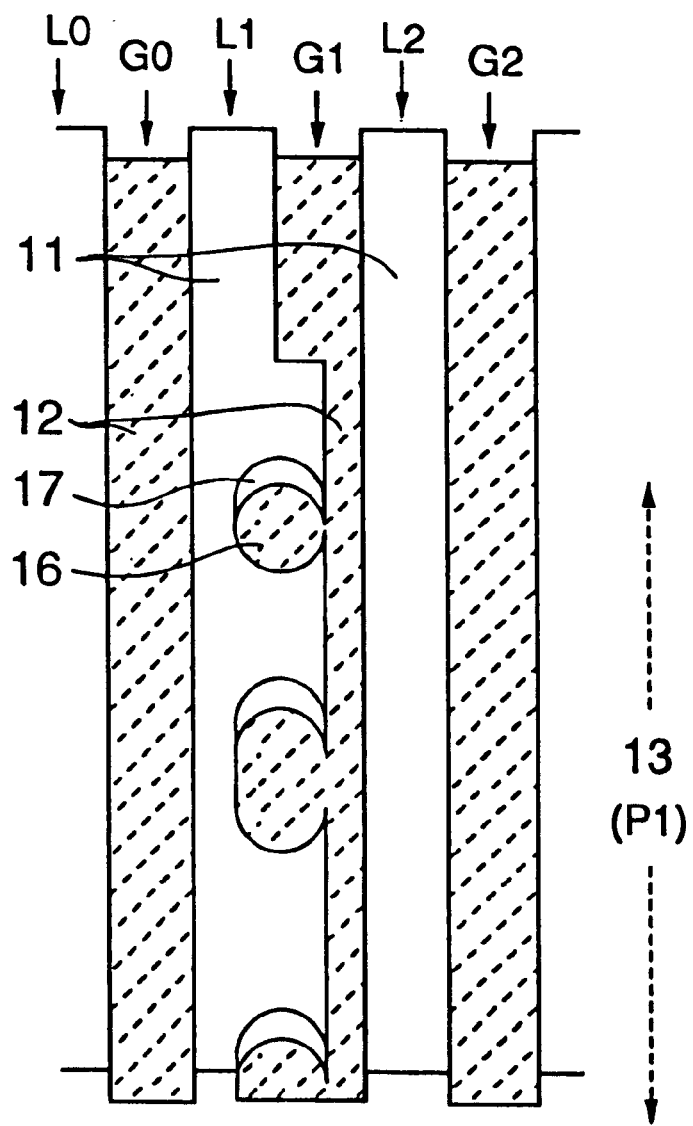
FIG. 8 is a partial plan of the prepit sequence section and neighboring recording track on the optical disk according to a third embodiment of the present invention.

FIG. 8 is a partial plan view of the prepit sequence section and neighboring recording track on the optical disk according to a third embodiment of the present invention. In the third embodiment, a depth of the groove track 12 is equal to a depth of the prepit 16 of the prepit sequence section 13 (P1). A width of the groove track 12 (G1) on the prepit sequence section 13 (P1) is narrower than the normal width of the groove track 12. In the recording process on the disk substrate shaping, the normal groove 12 and the prepit 16 are formed by the first optical beam, and the narrow groove G1 on the prepit sequence section 13 is formed by the second optical beam. Number 17 indicates a slope section of the pit 16. In the third embodiment, as for the prepit signal when reading from the land track 11, the reflected light diffracts at the ⊔ part and the optical quantity decreases. As for the prepit signal when reading from the groove track 12, the reflected light diffracts at the ⊓ part and the optical quantity decreases. These prepit signals have reverse polarity to each other. However, the essential effects are the same as the first embodiment.

Figure 9:
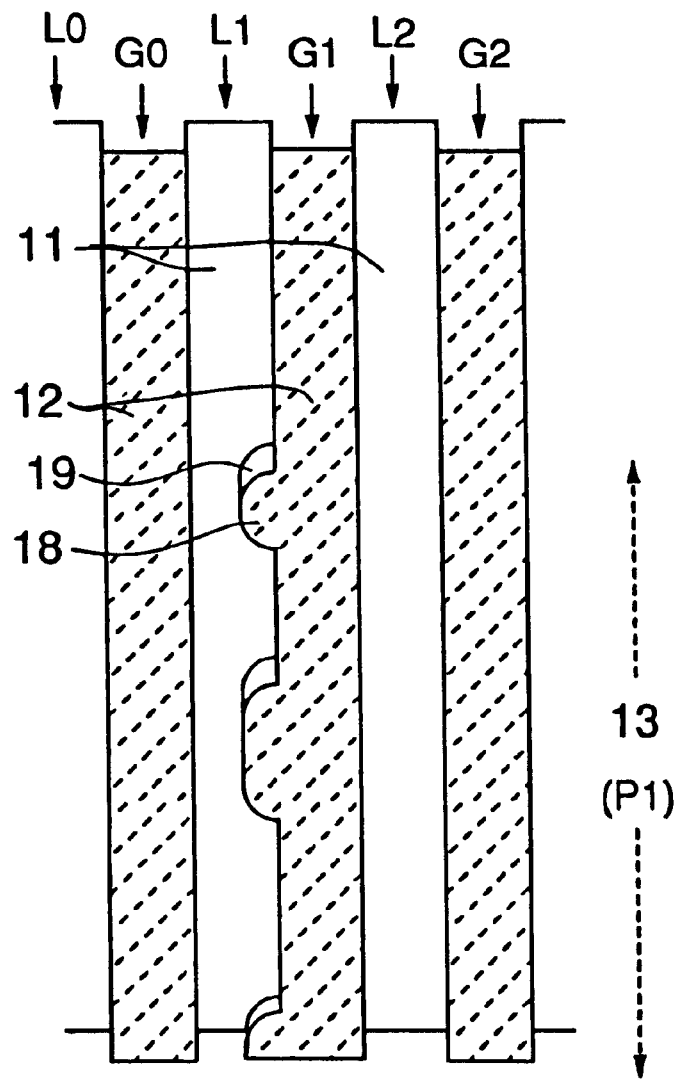
FIG. 9 is a partial plan of the prepit sequence section and neighboring recording track on the optical disk according to a fourth embodiment of the present invention.

FIG. 9 is a partial plan of the prepit sequence section and neighboring recording track on the optical disk according to a fourth embodiment of the present invention. As an aspect different from the third embodiment shown in FIG. 8, as shown in FIG. 9, the groove width of the groove track 12 is not narrow on the prepit sequence section 13. The groove width is constantly fixed and the prepit 18 as a semicircular shape is partially formed by extending from the groove track G1 on the prepit sequence section 13. In this case, the groove depth is equal to a depth of the prepit 18. Number 19 indicates a slope section of the prepit 18.

In the fourth embodiment, when reading from the groove track 12, the prepit signal is read from the prepit 18 as the outside part of the track width of the optical beam irradiates the groove track G1. Therefore, the signal amplitude is lower than in the third embodiment in FIG. 8. However, the recording of the disk substrate shaping is easily executed. The other effect is the same as in the first embodiment.

In the first, second, third, and fourth embodiments, the land track and the groove track are straightly formed as a part of the circle on the disk. However, even if these tracks are wobbled on the disk in order to control the rotation speed of a spindle motor, the present invention is applied.

Figure 10:
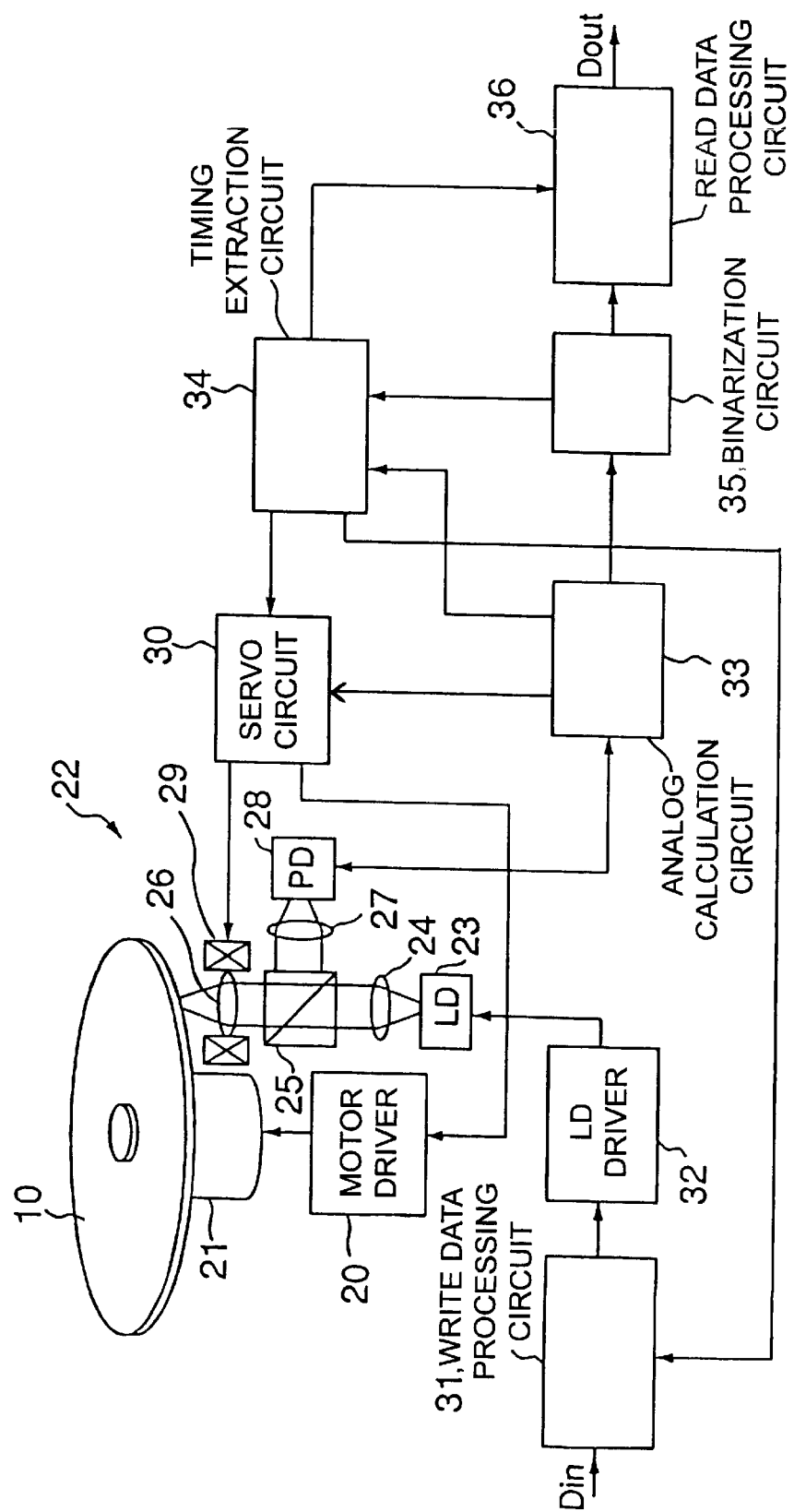
FIG. 10 is a block diagram of the optical disk apparatus according to a fifth embodiment of the present invention.

FIG. 10 is a block diagram of the optical disk apparatus according to a fifth embodiment of the present invention. In the fifth embodiment, data reading/writing is executed by driving the optical disk explained in the first, second, third, and fourth embodiments. In FIG. 10, the optical disk 10 is rotated by a spindle motor 21. The spindle motor 21 is driven by a motor driver 20. An optical head 22 facing the optical disk 10 reads and writes information.

The optical head 22 includes a laser diode (LD) 23, a collimator lens 24, a beam splitter 25, an object lens 26, a focusing lens 27, an optical detector 28, and a lens actuator 29. The laser diode 23 is used a source of light. The collimator lens 24 converts the optical beam from the laser diode 23 as parallel light. The beam splitter 25 separates the incident light to the optical disk 10 from the reflected light on the optical disk 10. The object lens 26 focuses the optical beam passed through the beam splitter 25 and irradiates a minute optical beam spot on the optical disk 10. The focusing lens 27 focuses the light reflected from the optical disk 10 and guided by beam splitter 25. The optical detector 28 detects the reflected light focused by the focusing lens 27. The lens actuator 29 moves the object lens 26 along an optical axis direction (focus direction) and a tracking direction.

The optical detector 28 is used as multi-division detector by dividing a detection area into a plurality of areas (for example, four areas). A plurality of output signals from the optical detector 28 is input to an analog calculation circuit 33. The analog calculation circuit 33 generates a read signal corresponding to data recorded in the optical disk 10, a focus error signal for a focus servo and a tracking error signal for a tracking servo, and a speed control signal for controlling the rotation speed of the spindle motor 21. The focus servo is a control to coincide the focus of the object lens with a recording surface of the optical disk 10. The tracking servo is a control to follow the optical beam irradiated on the optical disk 10 to the track.

The focus error signal and the tracking error signal are input to a servo circuit 30 to control the lens actuator 29. The lens actuator 29 controls the object lens along the focus direction and the tracking direction. Furthermore, the servo circuit 30 controls the motor driver 20 by speed control signal generated from a cycle signal obtained by the optical disk.

Next, writing activation and reading activation will be explained.

(Writing Activation)

In case of writing activation, after write data sequence "Din" are processed by a write data processing circuit 31, the write data sequence is input to a LD driver 32. The LD driver 32 modulates the intensity of the optical beam for a laser diode 23. This modulated optical beam is irradiated to the optical disk 10 through the collimator lens 24, the beam splitter 25, and the object lens 26. In this way, the write data sequence is written on the recording film of the optical disk 10 as a record mark, for example, a phase change mark from crystalline to amorphous or from amorphous to crystalline. Then, the reflected light from the optical disk is incident on the optical detector 28 through the object lens 26, the beam splitter 25, and the focusing lens 27. An output from the optical detector 28 is input to the analog calculation circuit 33 to generate signals corresponding to the prepit sequence 13 on the optical disk 10. In case of the land track 11 and the groove track 12 wobbled on the optical disk 10, the cycle signal whose amplitude changes in correspondence with wobble pattern is generated. A timing extraction circuit 34 generates header information of each sector or position information of the ECC block according to the signals corresponding to the prepit sequence. When the land track 11 and the groove track 12 wobble, the timing extraction circuit 34 generates the speed control signal according to cycle signal corresponding to the wobble pattern. The speed control signal is input to the servo circuit 30. The servo circuit 30 controls the spindle motor 21 at a predetermined rotation speed through the motor driver 20 according to the speed control signal. Furthermore, the analog calculation circuit 33 generates the focus error signal and the tracking error signal. According to these signals, the servo circuit 30 directs the lens actuator 29 to execute the focus servo and the tracking servo.

(Read Activation)

In case of read activation, the optical beam outgoing from the laser diode 23 is irradiated on the optical disk 10 through the collimator lens 24, the beam splitter 25, and the object lens 26. The reflected light from the optical disk 10 is incident to the optical detector 28 through the object lens 26, the beam splitter 25, and the focusing lens 27. Output from the optical detector 28 is input to the analog calculation circuit 33. The analog calculation circuit 33 outputs the read signal such as change of reflection ratio corresponding to record mark on the recording film. Furthermore, the analog calculation circuit 33 generates the cycle signal corresponding to any wobble pattern on the optical disk 10, the focus error signal, and the tracking error signal. The timing extraction circuit 34 generates the speed control signal according to the cycle, signal. According to the speed control signal, the servo circuit 30 controls the spindle motor 21 as predetermined rotation speed through the motor driver, 20. Furthermore, according to the focus error signal and the tracking error signal, the servo circuit 30 controls the lens actuator 29 to execute the focus servo and the, tracking servo.

The read signal from the analog calculation circuit 33 is binarized by a binarization circuit 35 and input to the timing extraction circuit 34. The timing extraction circuit 34 extracts a synchronization pattern in the read signal from the binary data, i. e., a position of the synchronization pattern and the pattern itself. The read signal includes bit error generated by a medium defect or noise on the optical disk 10. The timing extraction circuit 34 may incorrectly extract the synchronization pattern at the position different from the original synchronization pattern. Therefore, the timing extraction circuit 34 includes a function to correctly extract the position of the synchronization pattern. In addition to the detected position signal of the synchronization pattern, by using the synchronization pattern detection signal representing a kind of synchronization pattern, the timing extraction circuit 34 determines each boundary of a demodulated symbol, a record block, and a modulated record sector. Output from the binarization circuit 35 is input to a read data processing circuit 36. The read data processing circuit 36 executes the reverse processing of the write data processing circuit 31 for the binary signal from the binarization circuit 35, and outputs the read data sequence "Dout".

In the above-mentioned optical disk apparatus, the optical disk explained in the first, second, third, and fourth embodiments is used as the optical disk 10. Therefore, in comparison with the use of the optical disk of the prior art, a large quantity of data is recorded and read by the optical disk apparatus.

As mentioned-above, in the present invention, the groove track is continuously formed in the prepit sequence forming section. Furthermore, a plurality of the prepit sequence forming sections are not located along the radius direction on the optical disk (cross-track direction). Therefore, the track neighboring the prepit sequence along the radius direction on the optical disk is used as the data record area.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An optical recording medium on which a land track and a groove track are formed as a recording track to read and write information, the recording track being formed in spiral, the optical recording medium comprising:

a prepit sequence formed on a middle position between the land track and the neighboring groove track at predetermined intervals of equal linear length along the spiral of the recording track, the predetermined interval being a linear length of each sector on the recording track, the groove track being continuously formed on the prepit sequence section.

2. The optical recording medium according to claim 1, wherein the land track and the groove track are mutually formed as the recording track in one spiral line on said optical recording medium.

3. The optical recording medium according to claim 1, wherein the land track and the groove track are respectively formed as the recording tracks of two parallel spiral lines on said optical recording medium.

4. The optical recording medium according to claim 1, wherein the prepit sequence is formed for each sector on the recording track as a head part of each sector.

5. The optical recording medium according to claim 1, wherein the prepit sequence is formed for each error correction block on the recording track as a head part of each block.

6. The optical recording medium according to claim 1, wherein a prepit depth of the prepit sequence is different from a groove depth of the groove track.

7. The optical recording medium according to claim 6, wherein the prepit depth of the prepit sequence is longer than the groove depth of the groove track.

8. The optical recording medium according to claim 6, wherein the prepit depth is determined based on the groove depth so that an interference condition in case of reading the information from the land track is the same as an interference condition in case of reading the information from the groove track.

9. The optical recording medium according to claim 8, wherein if the groove depth is one-sixth of a wavelength of an optical beam irradiated on the optical recording medium, the prepit depth based on the land track is one-third of the wavelength of the optical beam irradiated on the optical recording medium and the prepit depth based on the groove track is one-sixth of the wavelength of an optical beam irradiated on the optical recording medium.

10. The optical recording medium according to claim 1, wherein a width of the groove track on the prepit sequence section is shorter than a width of the groove track not on the prepit sequence section.

11. The optical recording medium according to claim 10, wherein the prepit depth of the prepit sequence is equal to the groove depth of the groove track.

12. The optical recording medium according to claim 1, wherein the land track and the groove track on the prepit sequence section do not receive information for writing.

13. An optical read/write apparatus, comprising:

a spindle motor rotating an optical recording medium on which a land track and a groove track are formed as a recording track, the recording track being formed in spiral, the optical recording medium including a prepit sequence formed on a middle position between the land track and the neighboring groove track at predetermined intervals of equal linear length along the spiral of the recording track, the predetermined interval being a linear length of each sector on the recording track, the groove track being continuously formed on the prepit sequence section;

an optical head irradiating an optical beam on the optical recording medium rotated to read and write information; and an optical detector detecting a signal corresponding to the information from a reflected light on the optical recording medium.

14. The optical read/write apparatus according to claim 13, wherein the land track and the groove track are mutually formed as the recording track in one spiral line on said optical recording medium.

15. The optical read/write apparatus according to claim 13, wherein the land track and the groove track are respectively formed as the recording tracks of two parallel spiral lines on said optical recording medium.

16. The optical read/write apparatus according to claim 13, wherein the prepit sequence is formed for each sector on the recording track as a head part of each sector.

17. The optical read/write apparatus according to claim 13, wherein the prepit sequence is formed for each error correction block on the recording track as a head part of each block.

18. The optical read/write apparatus according to claim 13, wherein a prepit depth of the prepit sequence is different from a groove depth of the groove track.

19. The optical read/write apparatus according to claim 18, wherein the prepit depth of the prepit sequence is longer than the groove depth of the groove track.

20. The optical read/write apparatus according to claim 18, wherein the prepit depth is determined based on the groove depth so that an interference condition in case of reading the information from the land track is the same as an interference condition in case of reading the information from the groove track.

21. The optical read/write apparatus according to claim 20, wherein if the groove depth is one-sixth of the wavelength of the optical beam irradiated on the optical recording medium, the prepit depth based on the land track is one-third of the wavelength of the optical beam irradiated on the optical recording medium and the prepit depth based on the groove track is one-sixth of the wavelength of the optical beam irradiated on the optical recording medium.

22. The optical read/write apparatus according to claim 13, wherein a width of the groove track on the prepit sequence section is shorter than a width of the groove track not on the prepit sequence section.

23. The optical read/write apparatus according to claim 22, wherein the prepit depth of the prepit sequence is equal to the groove depth of the groove track.

24. The optical read/write apparatus according to claim 13, wherein the land track and the groove track on the prepit sequence section do not receive information for writing.

* * * * *